United States Patent [19]

Tzeng et al.

[11] Patent Number: 5,786,085
[45] Date of Patent: Jul. 28, 1998

[54] ASPHALTIC POLYURETHANE FOAM FOR ROOFING APPLICATIONS

[75] Inventors: Casey G. Tzeng, Irvine; George F. Thagard, III, Coto De Caza, both of Calif.

[73] Assignee: Fontana Paper Mills, Inc., Fontana, Calif.

[21] Appl. No.: 325,131

[22] Filed: Oct. 20, 1994

[51] Int. Cl.$^6$ .............................. B32B 5/30; B32B 5/22; E04B 7/00; E04D 1/30
[52] U.S. Cl. .......................... 428/417.9; 52/57; 52/198; 52/199; 52/315; 52/554; 428/147; 428/489; 454/365
[58] Field of Search ..................... 52/57, 198, 199, 52/315, 554; 428/317.9, 147, 489

[56] References Cited

U.S. PATENT DOCUMENTS

| | | | |
|---|---|---|---|
| 4,225,678 | 9/1980 | Roy | 521/161 |
| 4,434,589 | 3/1984 | Freiborg | 52/57 |
| 4,737,524 | 4/1988 | Ako et al. | 521/101 |
| 5,232,530 | 8/1993 | Malmquist et al. | 156/79 |
| 5,305,569 | 4/1994 | Malmquist et al. | 156/79 |
| 5,611,186 | 3/1997 | Weaver | 52/557 |

FOREIGN PATENT DOCUMENTS

| | | |
|---|---|---|
| 5164489 | 6/1976 | Japan . |
| 5268125 | 6/1977 | Japan . |
| 5795392 | 6/1982 | Japan . |

OTHER PUBLICATIONS

105: 192590y "Manufacture of plastic foams containing asphalt", Kumasaka, et al., *Chemical Abstracts*, Chapter 38–Plastics Fabr., Uses, vol. 105, p. 73, 1986 (corresponding to Japanese 61 152,744, Jul. 11, 1986).

106: 197621q "Vibration damping materials", Kurashige, et al., *Chemical Abstracts*, Chapter on Plastics Fabr., Uses, vol. 106, 1986 (corresponding to Japanese 61 261,040, Nov. 19, 1986).

107: 177684e "Cellular asphalt", Kumasaka, et al, *Chemical Abstracts*, Chapter 38–Plastics Fabr., Uses, vol. 107, p. 82, 1987 (corresponding to Japanese 62 116,642, May 28, 1987).

107: 177685f "Cellulr Asphalt", Kumasaka, et al., *Chemical Abstracts*, Chapter 38–Plastics Fabr., Uses, vol. 107, pp. 82–83, 1987 (corresponding to Japanese 62 116,641, May 28, 1987).

108: 222931s "Process for producing asphalt–blended polyurethane foams", Ako, et al., *Chemical Abstracts*, Chapter 39–Elastomers, vol. 108, p. 55, 1988 (corresponding to British GB 2, 192,635, Jan. 20, 1988).

114: 44076f "A novel asphalt–blended polyurethane foam", Ako, et al., from *Proc. SPI Annu. Tech., Mark., Conf.* (1989), *Chemical Abstracts*.

100: 214403x "Polyurethane–based sound–insulating structures for automobiles", Yokoyama, et al., *Chemical Abstracts*, Chapter 38–Plastics Fabr., Uses, vol. 110, 1989 (corresponding to Japanese 63 270,261, Nov. 8, 1988).

88: 192143k "Polyurethane foams waterproofed with asphalts", Kusakawa, et al., *Chemical Abstracts*, vol. 88, p. 192142, 1978 (corresponding to Japanese 77 151,395, Dec. 15, 1977).

91: 158547x "Polyurethane foam containine asphalt and an oily hydroxylated glyceride", Thagard, *Chemical Abstracts*, Chapter 36–Plastics Manuf., vol. 91, p. 158446, 1979 (corresponding to Belgian 874,524, Jun. 18, 1979).

93: 221488n "Foamed polyurethane materials with a bitumen and a hydroxy fatty oil", Roy, et al., *Chemical Abstracts*, vol. 93, pp. 221487–221488, 1980 (corresponding to U.S. 4,225,678, Sep. 30, 1980).

91: 22201x "Foams with good sound absorption and anti–vibration property", Murata, et al., *Chemical Abstracts*, vol. 91, p. 22197, 1979 (corresponding to Japanese 79 03,199, Jan. 11, 1979).

100: 140321p "Asphalt foams", (no inventor name listed) Toyo Rubber Chemical Industry Co., Ltd., *Chemical Abstracts*, Chapter 37–Plastics Manuf., vol. 100, p. 140330, 1984 (corresponding to Japanese 58 213,029, Dec. 10, 1983).

102764j "Expanded rigid polyurethane", (no inventor name listed) Manufacturas Jose Jover, S.A., *Chemical Abstracts*, Chapter 36–Plastics Manuf., vol. 77, p. 102772, 1972 (corresponding to Spanish 375,769, Apr. 16, 1972).

97: 24735x "Asphalt–containing polurethane foams", (no inventor name listed) NHK Spring Co., Ltd, *Chemical Abstracts*, vol. 97, p. 38, 1982 (corresponding to Japanese 82 47,336, Mar. 18, 1982).

93: 205803f "Thermally insulating building materials", Marusho, Japanese 80 21,144, Apr. 15, 1977.

104: 23479t "Asphalt foams useful for building materials", (no inventor name listed) Human Industry Corp, *Chemical Abstracts*, Chapter 58–Cement, Concrete, vol. 104, p. 251, 1986 (corresponding to Japanese 60 120,730, Jun. 28, 1985).

91: 141870z "Polyurethane foams", Maruyama, et al., *Chemical Abstracts*, vol. 91, p. 44, 1979 (corresponding to Japanese 79 77,695, Jun. 21, 1979).

(List continued on next page.)

*Primary Examiner*—Ana Woodward
*Attorney, Agent, or Firm*—Knobbe, Martens, Olson & Bear, LLP

[57] ABSTRACT

An asphaltic polyurethane foam useful in roofing applications. The foam is made from asphalt having a penetration range of between approximately 5–25, a softening point of between approximately 120° F. and 200° F., and an asphaltene content of no more than about 30%. This asphalt is liquified and mixed with a mixture of polyols such as Voranol 270, Multranol 9138, and castor oil. Other chemicals, such as a surfactant, a viscosity reducer, and a flame retardant can also be included in this mixture. The mixture is then brought to a temperature of between approximately 140° F. and 220° F., mixed with a polyisocyanate and water, and reacted to form an asphaltic polyurethane foam.

30 Claims, 4 Drawing Sheets

OTHER PUBLICATIONS

90: 7299w "Stable foam material based on hydrocarbon binder", Smadja, *Chemical Abstracts*, Chapter 37–Plastics Fabr., Uses, vol. 90, p. 43, 1979 (corresponding to French 2,370,075, Jun. 2, 1978).

91: 142024p "Polyurethane foams", Kusakawa, et al., *Chemical Abstracts*, Chapter 39–Textiles, vol. 91, p. 55, 1979 (corresponding to Japanese 79 77,696, Jun. 21, 1979).

107: 218892s "Manufacture of asphalt foams by one–shot method", Kumasaka, et al., *Chemical Abstracts*, vol. 107, p. 58, 1987 (corresponding to Japanese 62 116,643, May 282, 1987).

108: 76723g "Asphalt foams", Kumasaka, et al., *Chemical Abstracts*, Chapter 38–Plastics Fabr., Uses, vol. 108, p. 61, 1988 (corresponding to Japanese 62 172,039, Jul. 29, 1987).

"Standard Test Method for Penetration of Bituminous Materials", *ASTM*, Designation: D 5, pp. 4–8, 1983.

"Standard Test Method for Softening Point of Bitumen (Ring–and–Ball Apparatus)", *ASTM*, Designation: D 36, pp. 12–15, 1976.

"Hydrogen Donors", Chapter 3, *The Development and Use of Polyurethane Products*, pp. 44–51.

"Roofing Bitumen Asphalt and Coal Tar Pitch", Chapter 14, *LAALY—The Science and Technology of Traditional and Modern Roofing Systems*, pp. 14–9 through 14–12 and 25–8.

*Encyclopedia of Chemical Technology*, 2nd ed., vol. 2, pp. 784–793, John Wiley & Sons, Inc., pub. 1963.

60617k "Foam composites for filling enclosed spaces", Rubens, *Chemical Abstracts*, Chapter 37–Plastics Fabr., Uses, vol. 76, p. 43, 1972, (corresponding to U.S. 3,616,172, Oct. 26, 1971).

91: 158592h "Water–resistant polyurethane foams", Murata, et al., *Chemical Abstracts*, vol. 91, 1979 (corresponding to Japanese 79 77,697, Jun. 21, 1979).

92: 149869x "Asphalt, bitumen, tar, or pitch foam material", Troxler, *Chemical Abstracts*, Chapter 51–Fossil Fuels, vol. 92, p. 189, 1980 (corresponding to German 2,823,388, Dec. 13, 1979).

100: 176641g "Asphalt foam sealants", (no inventor name listed) Toyo Rubber Chemical Industry Co., Ltd., *Chemical Abstracts*, Chapter 42–Coatings, vol. 100, p. 95, 1984 (corresponding to Japanese 59 15,433, Jan. 26, 1984).

103: 179420g "Asphalt foams", Kumasaka, et al., *Chemical Abstracts*, Chapter 38–Plastics Fabr., Uses, vol. 103, p. 57, 1985 (corresponding to Japanese 60 135,438, Jul. 18, 1985).

103: 106014t "Lightweight asphalt foams", (no inventor name listed) Toyo Rubber Chemical Industry Co., Ltd., *Chemical Abstracts*, Chapter 38–Plastics Fabr., Uses, vol. 103, p. 53, 1985 (corresponding to Japanese 60 96,616, May 30, 1985).

105: 192587c "Manufacture of plastic foams containing asphalt", Kumasaka, et al., *Chemical Abstracts*, Chapter on Plastics Fabr., Uses, vol. 105, 1986 (corresponding to Japanese 61 152,741, Jul. 11, 1986).

105: 192588d "Manufacture of plastic foams containing asphalt", Kumasaka, et al., *Chemical Abstracts*, Chapter on Plastics Fabr., Uses, vol. 105, 1986 (corresponding to Japanese 61 152,742, Jul. 11, 1986).

105: 192589e "Plastic foams containing asphalt", Kumasaka, et al., *Chemical Abstracts*, Chapter on Plastics Fabr., Uses, vol. 105, 1986 (corresponding to Japanese 61 152,743, Jul. 11, 1986).

Wolfert, C., "FilterVent", Technical Bulletin from Air Vent, Inc., No. 80–1, 3 pages, 1993.

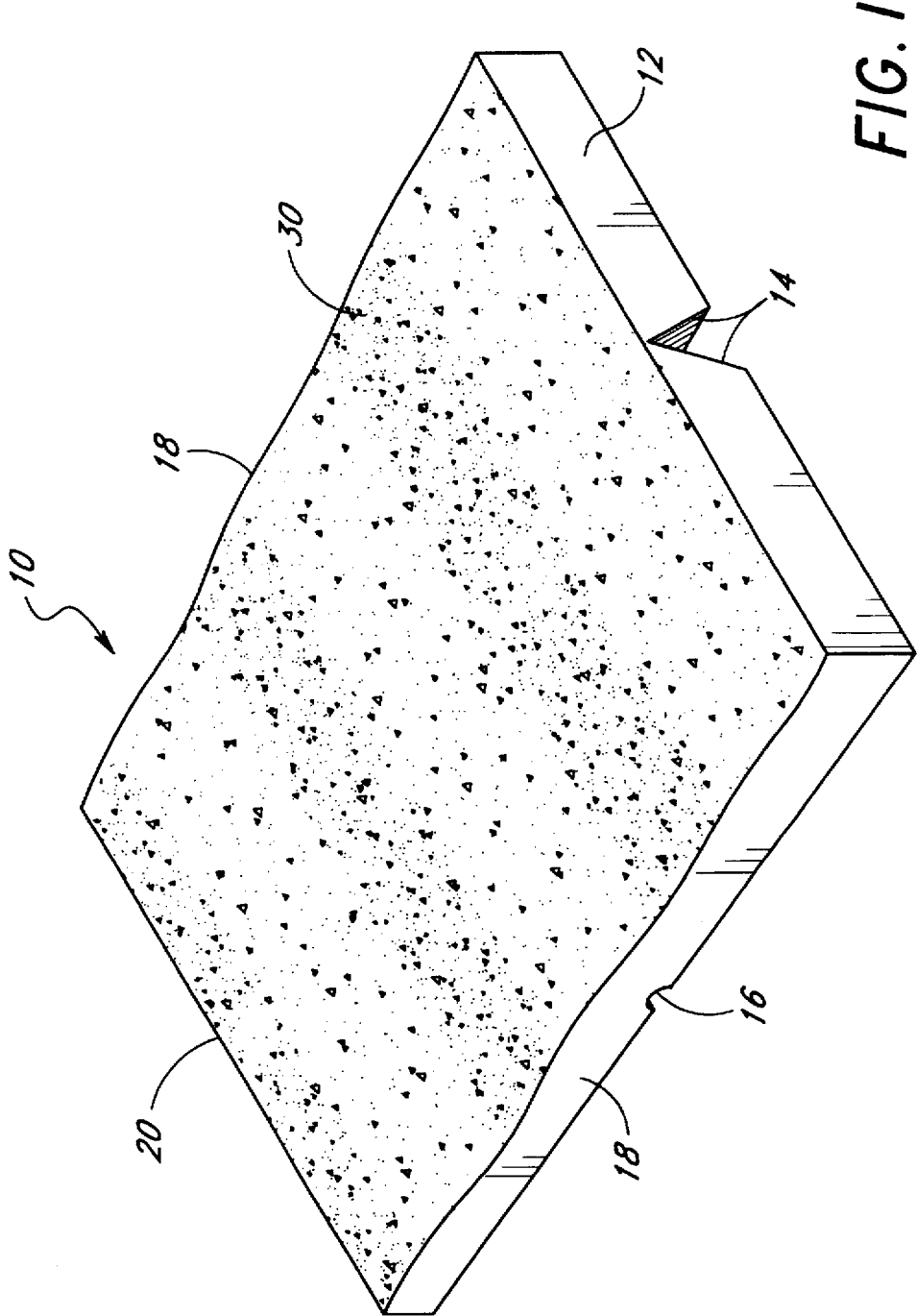

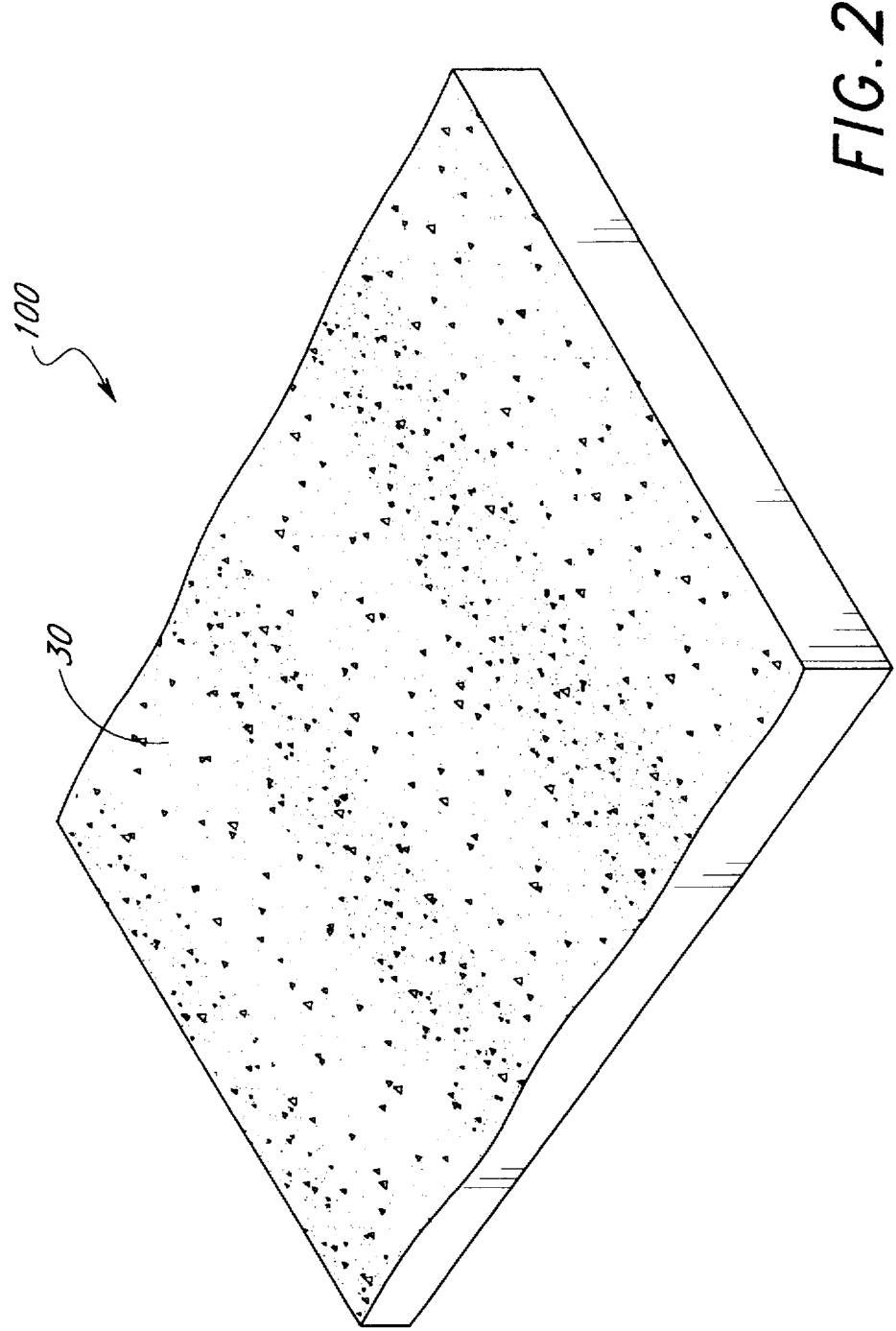

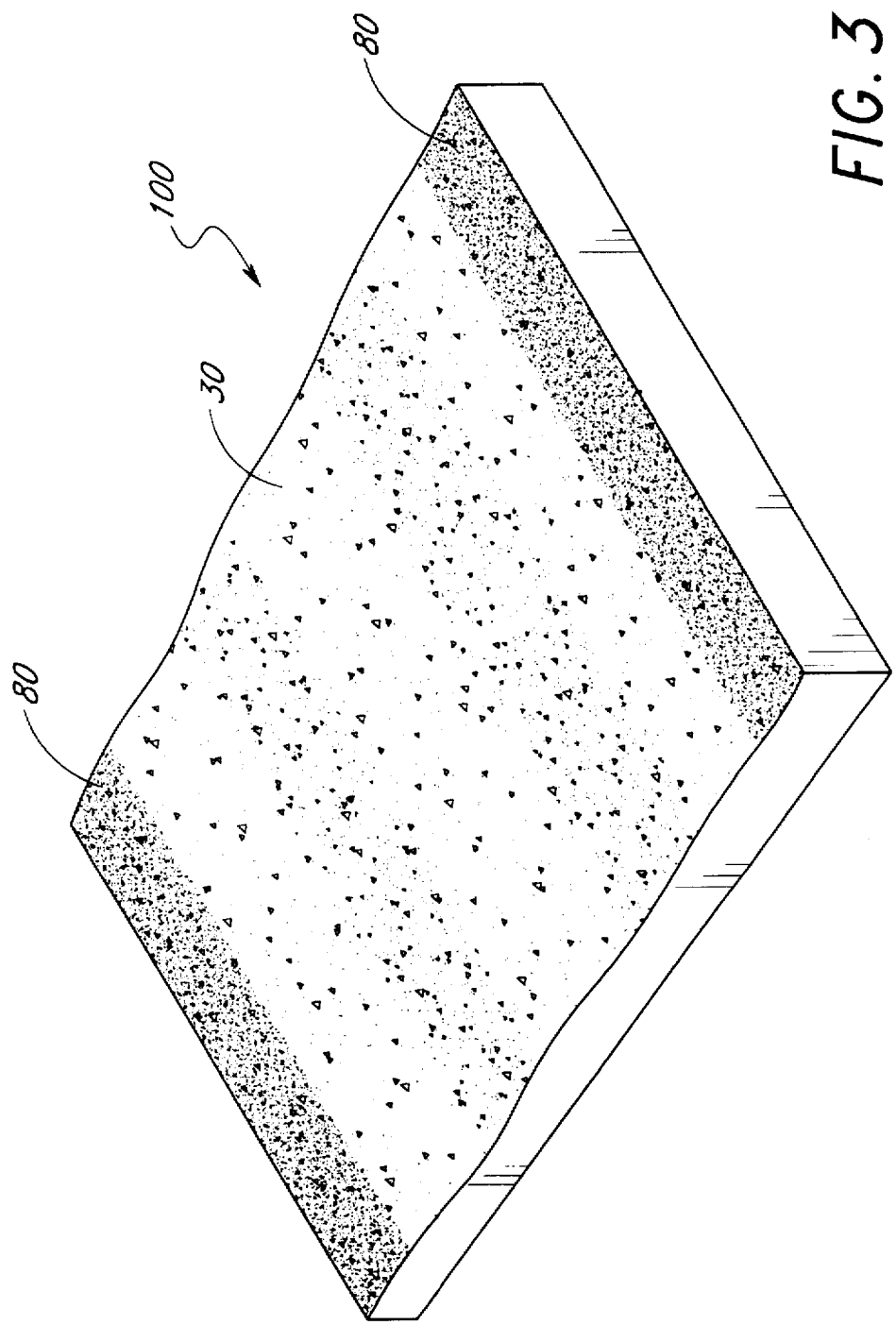

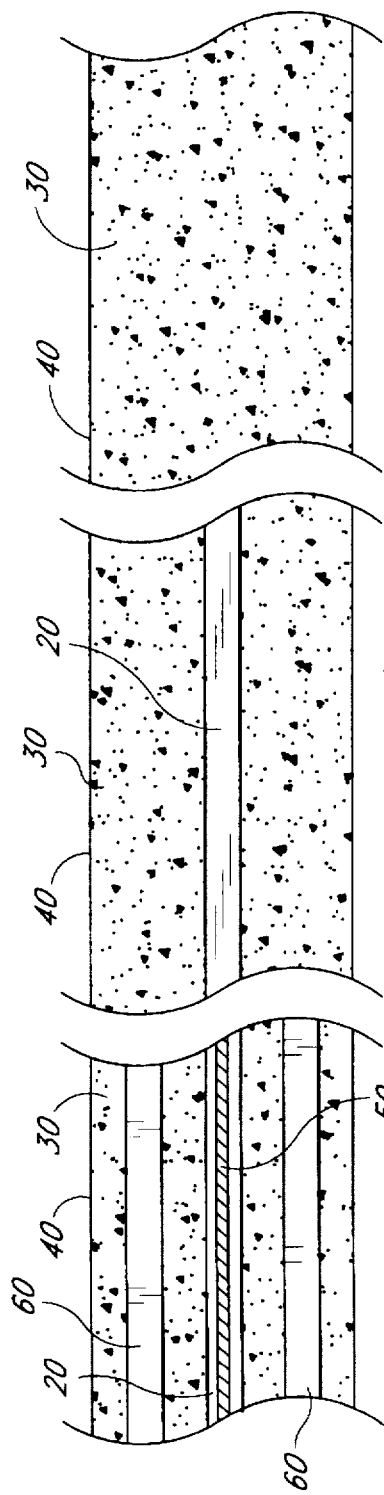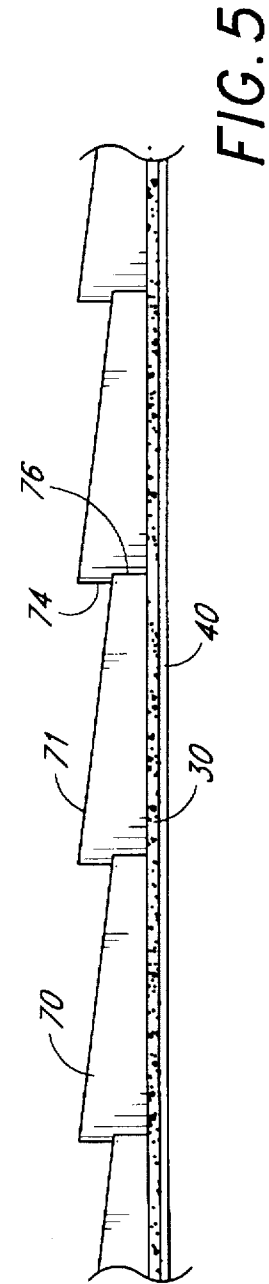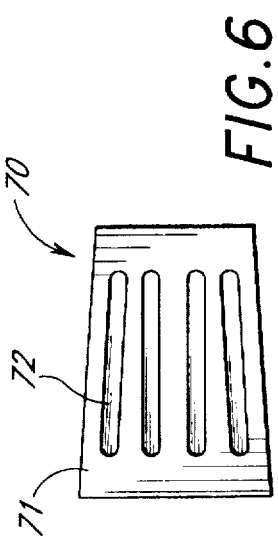

ASPHALTIC POLYURETHANE FOAM FOR ROOFING APPLICATIONS

FIELD OF THE INVENTION

The present invention relates to an asphaltic polyurethane foam which is useful in roofing applications.

BACKGROUND OF THE INVENTION

1. Asphaltic Foams

Many attempts have been made to incorporate asphalt into polyurethane foams. Primarily, asphalt has been used as a filler material for such foams, due to the fact that it is less expensive than the precursor chemicals used to produce polyurethane foam. For example, in Spanish Patent Application No. 375,769, a process is described in which asphalt powder is added to a polyurethane precursor mixture as a filler material. The asphalt powder and polyurethane form a uniformly distributed plastic mass.

The addition of asphalt to a polyurethane foam can also, however, impart certain desired characteristics to the foam. In Japanese Patent Application No. 76/64,489, for example, a polyurethane foam was waterproofed through the addition of asphalt to the polyurethane precursors. Another asphalt-polyurethane mixture having good sound absorption and anti-vibration properties is disclosed in Japanese Patent Application No. 77/68,125.

Most prior art processes for incorporating asphalt into polyurethane, such as Japanese Patent Application No. 76/64,489, have made use of soft asphalts with low softening points. Such asphalts can be liquified and blended with polyols at relatively low temperatures to form a uniform, liquid mixture of asphalt and polyols. By completely blending the liquified asphalt with the polyols, a uniform asphalt-polyurethane foam product can then be produced. In addition, because low softening point asphalt remains liquid at relatively low temperatures, the asphalt-polyol mixture can be reacted to form a foam at temperatures which are low enough that a controlled reaction can take place. However, such foam products generally have a relatively low asphalt content.

In Japanese Patent Application No. 76/64,489, for example, a soft asphalt having a needle penetration degree of 80 to 100 is used. This asphalt has a correspondingly low softening point of under 150 degrees. In the process of this patent, the asphalt is mixed with polyurethane precursors, and this mixture is then reacted to form a compressible product, i.e. a soft foam.

The use of such soft asphalts in prior art processes is acceptable when it is desirable for the resulting product to be a soft foam. However, in certain applications, a rigid asphaltic polyurethane foam would be advantageous. A process for making a rigid asphaltic polyurethane foam is disclosed, for example, in U.S. Pat. No. 4,225,678 to Roy. In this process, relatively high molar ratios of isocyanate to polyols are recommended, in some cases as high as 11:1. The Roy process therefore resulted in products which were too friable and/or which lacked sufficient compressive strength. When conventional roofing asphalt having a softening point of over 200° F. was used in the Roy process to produce asphaltic foams, the foaming reaction also was too fast, making manufacturing of asphaltic foams impracticable.

2. Asphalt in the Roofing Industry

Various asphalt-coated or asphalt-impregnated materials are in common use in the roofing industry. For example, water absorbent paper which has been saturated with low softening point asphalt, known as saturated felt, is usually placed underneath other roofing components. The asphalt of the saturated felt provides the felt with secondary water repellency.

Higher softening point asphalt is put on either side of saturated felt to form base sheets, which go under the tiles of a roof to build up the roof system. Base sheets with mineral surfacing on their upper surfaces, known as mineral surface rolls, provide enhanced durability and fire retardancy to a roof and can also enhance a roof's appearance. Mineral surface rolls have been used as ridge caps, the largely ornamental structures which straddle the peak of a roof.

However, asphalt-impregnated papers suffer from various drawbacks. When used as ridge caps, for example, mineral surface rolls must be bent to fit the ridge-line of a roof. Mineral surface rolls are also sometimes bent to make them thicker and give a ridge line a layered appearance. Bending a mineral surface roll causes the asphalt and substrate to crack, however, leaving the cracked material exposed to the elements. The mineral surface roll tends to deteriorate at the site of such cracks within 3 to 4 years of being installed or even sooner, resulting in leaks and other roof damage.

Alternative materials, such as rubberized asphalt with a flexible polyester substrate, have also been used in the roofing industry. For example, modified asphalt has been used in mineral rolls to avoid cracking the asphalt and its substrate.

In light of the foregoing, there remains a need for improved asphalt-containing roofing materials, particularly for use as ridge caps. In addition, there is a need for asphaltic foams having greater rigidity which are adapted for use in manufacturing foam articles. These and other needs are met by the asphaltic foams and foam products of the present invention, and by the methods described herein for producing these foam products.

SUMMARY OF THE INVENTION

According to the present invention, a rigid polyurethane foam which incorporates asphalt and which has unique properties can be produced. This asphaltic foam is rigid, relatively light-weight, dimensionally stable when exposed to the weather elements, and has good cell structure and compressive strength. Therefore, unlike prior art foams, the asphaltic foam of the present invention can be used in structural applications, such as roofing applications.

In one aspect, the present invention comprises a method of producing a rigid asphaltic foam, comprising the steps of:

a) providing asphalt having a penetration range of between approximately 5–25 and a softening point of between approximately 120° F. and 200° F.;

b) liquefying the asphalt;

c) adding to the asphalt a polyol, thereby forming an intermediate mixture, wherein the polyol has between 3 and 6 functionalities;

d) bringing the temperature of the intermediate mixture to between approximately 140° F. and 220° F.;

e) adding a blowing agent to the intermediate mixture, thereby forming a foamable mixture; and f) mixing a polyisocyanate with the foamable mixture, the polyisocyanate being added to the foamable mixture in a molar ratio of polyisocyanate:polyol of between about 1.3:1 and about 1.1:1, wherein the polyisocyanate and the foamable mixture react to form the asphaltic foam.

In a preferred embodiment, the asphalt used in this methods has an asphaltene content of no more than about 30%. The polyol component is preferably added to the asphalt in an amount of between about 5% and about 100% by weight of the asphalt. The polyol itself is preferably a mixture of different polyols, and more preferably comprises approximately equal amounts of 1) a first polyol, the first polyol having three hydroxy functionalities; 2) a second polyol having three hydroxy functionalities; and castor oil. In a preferred embodiment, the first polyol is Voranol 270 and the second polyol is Multranol 9138.

The foregoing method can additionally comprising the step of mixing polypropylene with the asphalt between steps (b) and (c), wherein the polypropylene is added in an amount of up to about 10% by weight of the asphalt, more preferably in an amount of about 5% by weight of the asphalt. In a preferred embodiment, the polypropylene is atactic polypropylene.

The method in this aspect of the invention can also include a number of other steps. For example, a catalyst can be added to the intermediate mixture. A modified asphalt weight viscosity reducer can also be mixed into the intermediate mixture, preferably in an amount of approximately 4% by weight of the polyol of the reaction mixture. This viscosity reducer can be, in one embodiment, Viplex 5.

The blowing agent of the foregoing process is preferably water, which can be added in an amount of about 1–5% of the weight of the polyol, preferably in an amount of about 2% of the weight of the polyol. In addition, the asphalt used in the process preferably comprises about 26.8% by weight asphaltene, about 8.8% by weight saturated hydrocarbons, about 30.5% polar components, and about 33.9% aromatic components. The polyisocyanate for this process is also preferably selected from the group consisting of Mondur E-489, PAPI 580, Rubinate HF-185, and Lupranate M70.

In another aspect, the present invention comprises a rigid asphaltic foam material produced according to the foregoing method. This material is a rigid asphaltic polyurethane foam which can have, for example, a compressive strength of more than 60 psi, more than 85% closed cells, a density of between 4 and 10 lb./ft.$^3$, and dimensional stability at 140° F. This material is suitable for roofing applications, for example for forming ridge caps and roofing tiles.

In yet another aspect, the present invention comprises a method of making a ridge cap, the method comprising the steps of:

a) providing a lower surface;

b) applying a granule layer to the lower surface;

c) placing a strip of modified asphalt on top of the granule layer along a central axis of the lower surface;

d) forming a mold having sides extending upward from the lower surface, e) filling the mold with the reaction mixture of claim 1; and f) allowing the reaction mixture to cure, thereby forming an asphaltic foam ridge cap.

This method can also additionally comprise the step of forming an indentation on the granule layer after applying the granule layer to the lower surface, in order to produce a pleasing aesthetic effect on the surface of the ridge cap.

In a preferred embodiment of the foregoing method, the lower surface is a conveyor belt and the ridge cap is formed by a continuous process, wherein step (c) additionally comprises placing the strip of modified asphalt on top of the granule layer continuously, and wherein step (e) comprises placing an asphaltic foam reaction mixture on the conveyor belt continuously and then placing a mold over the continuously placed reaction mixture and strip of modified asphalt. Preferably, the lower surface of the conveyor belt is relatively flat and even, although in one embodiment the lower surface can have a contoured shape in order to impart a design onto the final ridge cap product. In another embodiment, a second granule layer having a contrasting color compared to the color of the first granule layer can be applied to the lower surface. The foregoing process is adapted to produce a ridge cap according to the present invention.

BRIEF DESCRIPTION OF THE DRAWINGS

FIG. 1 illustrates a ridge cap made from the asphaltic foam material of the present invention.

FIG. 2 illustrates a roofing tile made from the asphaltic foam material of the present invention.

FIG. 3 shows a roofing tile similar to that of FIG. 2 but additionally having different colored granules deposited at two ends of the tile.

FIGS. 4a–4c diagram part of the process for manufacturing the ridge cap of FIG. 1.

FIG. 5 is a side view of a conveyor belt with molds on it for forming the ridge cap of FIG. 1.

FIG. 6 is a top view of one of the molds shown in FIG. 3.

DETAILED DESCRIPTION OF PREFERRED EMBODIMENTS OF THE INVENTION

Asphalt has long been used in waterproofing applications, particularly in the roofing industry. In the roofing industry, asphaltic materials are used due to their low cost, durability, and ability to withstand water and extremes of heat. Papers saturated or impregnated with asphalt, for example, are commonly used to cover roofs.

Asphaltic papers are not very well suited to some applications, however. For example, when making covers for the ridges of a roof, i.e. ridge caps, asphaltic papers must be bent to fit the ridge line of the building. Because asphaltic papers are relatively inelastic, however, once bent they cannot retake their prior shape. During bending, the fibers of the paper as well as the asphalt itself is cracked and damaged.

There is therefore a need for an asphalt-containing material which can be used in structural applications and which has properties not heretofore found in other asphaltic materials.

I. Definitions

As used herein, the terms listed below shall be defined as follows, unless a contrary meaning is clear meant in context:

"Foaming reaction" shall mean the chemical reaction which occurs when a polyisocyanate is reacted with an asphalt-polyol mixture according to the process of the present invention to form an asphaltic polyurethane foam.

"Modified asphalt" shall refer to asphalt which has been blended with polypropylene, particularly atactic polypropylene, or with other asphalt modifiers such as styrene-butydiene-styrene (SBS).

"Penetration" shall mean the hardness of a material, as measured by the resistance of the material to penetration by a needle mounted on a penetrometer. A penetrometer is a device which holds a needle with a 100 gram (±0.05 grams) load and moves vertically without measurable friction. To determine the penetration value of a material, the tip of the needle of a penetrometer is positioned on the surface of a material whose hardness is to be tested, and the needle is allowed to penetrate into the material for 5 (±0.1) seconds at 77° F. (25° C.). The amount of penetration is rated in terms of the length of the needle, measured in tenths of millimeters, which penetrated the material in those 5 seconds. A numeric value corresponding to amount of penetration, in tenths of millimeters, is then assigned as the penetration value of the material. This procedure follows the standard test method for the penetration of bituminous materials promulgated by the American Society for Testing and Materials (ASTM Designation D 5–83). Since a needle will pass through a softer material more rapidly than a harder material, higher penetration values correspond to softer materials.

"Reaction mixture" shall refer to any combination of reactants used in the process of the present invention prior to being reacted in a foaming reaction.

"Softening point" means the temperature at which asphalt attains a particular degree of softness. Asphalt does not have a definite melting point, but instead changes slowly from a harder to a softer material with increasing temperature. The softening point is determined by placing a steel ball (9.53 mm in diameter) on a mass of asphalt contained in a brass ring. The ring has a brass plate at the bottom in contact with the asphalt sample. The asphalt and ball are then heated in a water or glycerol bath until the ball drops to the plate, which is 25 mm under the ring. The temperature at which the ball drops to the plate is the softening point. This procedure follows the standard test method for the softening point of bitumen promulgated by the American Society for Testing and Materials (ASTM Designation D 36–76).

The foregoing definitions pertain as well to other grammatical forms derived from these terms, including plurals.

II. Improved Asphaltic Foam

A. Reactants

1. Asphalt

Asphalt is a solid or semisolid mixture of hydrocarbons and small amounts of non-hydrocarbon materials, occurring naturally or obtained through the distillation of coal or petroleum. Most of the hydrocarbons in asphalt are bituminous, meaning that they are soluble in carbon disulfide. As is known to those of skill in the art, asphalt is a complex, colloidal mixture containing a broad spectrum of different hydrocarbon components. These components can generally be broken down into three main categories: two solid components, the asphaltenes and asphaltic resins, and one liquid component, the oily constituents.

Asphaltenes generally comprise the highest molecular weight and most aromatic components of asphalt. Asphaltenes are defined as the components of asphalt which are soluble in carbon disulfide but insoluble in paraffin oil (paraffin naphtha) or in ether.

Broadly categorized, the asphaltic resins and oily constituents can be further separated into saturated components, aromatic components, and resins or polar components. The polar components are responsible to some degree for the viscosity of an asphalt.

In order to produce the unique asphaltic polyurethane foam of the present invention, asphalt meeting certain specifications must be used in the process for manufacturing this foam. We have found that the hardness of the asphalt component of the foam contributes to the rigidity of the final foam product. Therefore, in order to give the final product sufficient rigidity, an asphalt having a penetration range of about 5 to about 25 should be chosen. Preferably, an asphalt having a penetration range of between about 8 and about 18 is used, and more preferably an asphalt having a penetration of about 12 is used.

The hardness of asphalt is, in turn, generally correlated to its asphaltene content, although the asphaltic resin components of asphalt will also contribute to an asphalt's hardness. The asphalt used to produce the foam of the present invention preferably has an asphaltene content in the range of about 20% to about 30% by weight, more preferably in the range of about 25% to about 28%. In a particularly preferred embodiment, the asphalt used in the present invention has an asphaltene content of about 27%.

The asphalt used to produce the present asphaltic foam must, in addition, be chosen so as to have a relatively low softening point. An asphalt having a softening point of about 120° F. to about 200° F. should be used. Preferably, an asphalt having a softening point of 125° F. to 150° F. is used, and more preferably an asphalt having a softening point of 135° F. is used. As is known to those of skill in the art, the softening point of asphalt is influenced by the resin or oil content of the asphalt.

A preferred asphalt for use in the present invention is a non-blown (i.e., not air-oxidized) asphalt obtained from Oxnard Refinery (California) having the following specifications: a softening point of greater than 110° F. and less than 150° F., and a penetration range of greater than 5 and less than 15. This asphalt is composed (in weight percentages) of approximately 26.8% asphaltene, 8.8% saturated hydrocarbons, 30.5% polar components, and 33.9% aromatic constituents.

In total, the asphalt component of the reactants used in the process of the present invention can comprise up to approximately 40% by weight of the final finished product. Asphalt can, however, make up between about 5% and about 55% of the finished product used in the present process.

The use of lower amounts of asphalt in the process of the present invention will not significantly affect the reaction of that process. However, using greater amounts of asphalt than this can lead to the reaction mixture becoming more viscous (in the absence of viscosity reducers), necessitating the use of higher reaction temperatures in order to blend the reaction mixture components. This in turn increases the reaction rate to a point which becomes hard to control during manufacturing.

Generally, the more asphalt used, the more economical the final product will be, since asphalt is generally less expensive than the other components of the present asphaltic foam. Asphalt does, however, require energy to heat it. Higher asphalt levels will also lead to higher viscosity in the reaction mixture, which may cause manufacturing difficulties.

In addition, the amount of asphalt used will affect the physical properties of the finished asphaltic foam product of the present invention. With a higher asphalt content, the foam tends to be softer and to have a higher density. More free asphalt can also be extracted from the foam at higher asphalt levels.

2. Polypropylene

When producing the asphaltic foam of the present invention, it is preferred, though not essential, to blend polypropylene into the asphalt component of the reaction mixture. The addition of polypropylene to the asphalt enhances the strength of the final foam product of the present process. Atactic polypropylene (APP) is particularly preferred because it blends well with the asphalt.

When polypropylene is used in the present process, it is blended into the asphalt component of the reaction mixture in an amount of up to 10% by weight of the asphalt. More preferably, polypropylene is added in an amount of between about 3% and about 8%, and more preferably still is used in an amount of about 5% by weight of the asphalt.

In order to blend the polypropylene into asphalt, the asphalt is first heated to about 400° F. The polypropylene is then dropped into the hot asphalt and blended in with a mechanical mixer. Atactic polypropylene typically has a melting point of over 350° F., and so will melt on exposure to the hot asphalt.

Other modifiers can also be used in the same way as APP to modify the characteristics of the asphalt and/or the characteristics of the final asphaltic foam product of the present invention. Such modifiers include isotactic polypropylene (IPP), styrene-butydiene-styrene (SBS), styrene-isoprene-styrene (SIS), ethylene-propylene (EPM), ethylene-propylene-diene (EPDM), ethylene-vinyl acetate (EVAc), ethylene-acrylic ester (EAC), ethylene copolymer bitumen (ECB), polyethylene (PE), polyethylene chlorosulfonate (CMS), polyvinylchloride (PVC), butyl rubber (IIR), polyisobutylene (PIB), and polychloroprene (CR).

3. Polyols

Polyols are one of the polyurethane precursors necessary to form a polyurethane foam. A polyol is a hydrogen donor having a plurality of hydroxy (—OH) functional groups ("functionalities"). Polyols also sometimes comprise other hydrogen donor moieties, such as —NH, —SH, and/or —COOH. NH groups are generally more reactive than OH groups, followed by SH and COOH groups in reactivity. Polyols comprised mainly of —OH hydrogen donors have been found to be preferred in the present process because they react quickly enough to be commercially feasible but not so quickly as to produce a foaming reaction which cannot be controlled.

In the foaming reaction of the present process, hydroxy functional groups react with a molecule of isocyanate to form polyurethane. Several characteristics of the polyols influence their reactivity in foaming reactions as well as the nature of the foams produced by such reactions. One important characteristic of the polyols used in the process of the present invention is the number of functionalities the polyol has, that is the number of hydroxy groups available to react in a foaming reaction. The number of functionalities on a polyol influences both the speed of the foaming reaction and the amount of cross-linking in the asphaltic polyurethane product which results from the foaming reaction.

It has been found that a polyol having between 3 and 6 functionalities can be used to produce the asphaltic foam of the present invention. Preferably, the polyol has more than three functionalities per polyol molecule. Alternatively, a mixture of polyols which, in aggregate, have an average of between about 3 and 6 functionalities, preferably more than 3, can be used in the present process. In the present process, the best results have, in fact, been obtained when polyols used in the process comprise a mixture of approximately equal amounts by weight of the following three polyols:

(1) Voranol 270 (made by Dow Chemical Company, Urethane Dept., Midland, Mich. 48674), which has an average of 3 functionalities per molecule, a hydroxyl number (mg KOH/g) of 235, and a molecular weight of about 700;

(2) Multranol 9138 (made by Miles, Inc., Polymers Division, Mobay Road, Pa., 15205), which has on average 3 functionalities per molecule, a hydroxyl number of about 700, and a molecular weight of 240; and (3) castor oil (available as DB Oil from CASChem, Inc., 40 Avenue A, Bayonne, N.J. 07002), which has 2-3.5 functionalities per molecule, a hydroxyl number of 110-350, preferably a hydroxyl number of about 164, and a molecular weight of about 928.

When choosing polyols for use in the present process, it is preferred that the polyol or group of polyols have an aggregate molecular weight in the range of 200-1200, more preferably 300 to 900, and most preferably a molecular weight of about 620.

In general, a polyol having a higher number of functionalities will react more quickly in the foaming reaction than polyols with fewer functionalities. In addition, when the average number of functionalities in the polyols of the reaction mixture is higher, the foaming reaction also will tend to proceed more quickly.

In addition, the greater the number of functionalities there are present in the reaction mixture, the greater the amount of cross-linking which will occur in the final asphaltic polyurethane product. Greater cross-linking will generally yield a more rigid product. However, too much cross-linking will yield a product that is brittle and friable. Thus, the number of functionalities in the polyols used in the process of the present invention should be restricted as described above.

There are several other factors to consider when choosing polyols for use in the present invention. The viscosity of a polyol, for example, is important. Less viscous polyols are generally preferred, since the asphalt component of the reaction mixture is itself highly viscous, and less viscous polyols can help to lessen the viscosity of the reaction mixture. Polyols with a lower equivalent weight are also preferred, since lesser amounts of such polyols can be reacted with an equal amount of the isocyanate component compared with polyols with higher equivalent weights.

A preferred mixture of polyols for use in the present invention has a viscosity, equivalent weight, and functionality number which is the same as or similar to that of a mixture of equal amounts of Multranol 9138, Voranol 270, and D13 castor oil.

Of course, other polyols besides those enumerated above available commercially. Representative polyols which can be used according to the parameters outlined above include both polyester polyols and polyether polyols. Representative polyether polyols include poly (oxypropyrene) glycols, poly (oxypropylene-b-oxyethylene) glycols (block copolymers), poly (oxypropylene) adducts of glycerol, poly (oxypropylene) adducts of trimethylolpropane, poly (oxypropylene-b-oxyethylene) adduct of trimethylolpropane, poly (oxypropylene) adducts of 1,2,6-hexanetriol, poly (oxypropylene) adducts of pentaerythritol, poly (oxypropylene-b-oxyethylene) adducts of ethylenediamine (block copolymers), and poly (oxypropylene) adducts of sucrose methylglucoside, sorbitol. Representative polyester polyols include those prepared from the following monomers: adipic acid, phthalic anhydride, ethylene glycol, propylene glycol 1,3-butylene glycol, 1,4-butylene glycol, diethylene glycol, 1,2,6-hexanetriol, trimethylopropane and 1,1,1-trimethylolethane. Other polyols which can be used include N,N,N',N'-tetrakis (2-hydroxy-propyl)-ethylenediamine, which is commercially available under the trade name of "Quadrol" from BASF Wyandotte Corporation.

4. Viscosity Reducer

Although viscosity reducers are not essential to produce a foam product, they are preferably added to the reaction mixture in the process of the present invention. Viscosity reducers help reduce the viscosity of the reaction mixture when the foaming reaction is performed. Otherwise, higher temperatures have to be applied to the mixture during the process, which can cause the reaction to proceed too violently. In general, the viscosity reducer is added after the polyol or polyol mixture used in the present process has been mixed with the asphalt.

One viscosity reducer which has been advantageously used in the process of the present invention is Viplex 5 (available from Crowley Chemical, 261 Madison Ave., N.Y., N.Y. 10016). Viplex 885 and Viplex 525 can also be used. When Viplex 5 is added to the reaction mixture as a viscosity reducer, it can be added in an amount of between about 2% and about 10% by weight, based on the weight of the polyol. More preferably, Viplex 5 is added in an amount of about 4% by weight. Other viscosity reducers, such as some plasticizers, can also be used in the present process in place of Viplex 5. Adding too much viscosity reducer should be avoided, however, as it tends to soften the asphalt and the resulting asphaltic foam product.

5. Blowing Agent

In order to produce an asphaltic foam product with a greater degree of foaming, compositions referred to as "blowing agents" can be added to the reaction mixture. When added to a reaction mixture, blowing agents are initially liquids. However, blowing agents become gaseous during the foaming reaction and expand in volume. Such expansion causes the now gaseous blowing agents to exert force against the polymerizing reactants, thereby forming bubbles or cells in the final foam product.

One blowing agent which can be used is water. When water is added to the reaction mixture, it reacts with the polyisocyanate in the mixture to give an amine or polyamine and also carbon dioxide. Since water is dispersed homogeneously in the mixture, the carbon dioxide gas is evolved throughout the cell structure. It is advantageous for such carbon dioxide to be formed during the foaming reaction, in order for the bubbles formed by the carbon dioxide to produce the cells characteristic of polyurethane foams. Therefore, polyisocyanate and water should not be mixed together until the foaming reaction is begun.

When water is used as the sole blowing agent in the present process, it is added to the reaction mixture in an amount of between about 3% and about 6% by weight, and preferably in an amount of about 4% by weight, based on the weight of the polyols. If other blowing agents were added to the reaction mixture in addition to water, a correspondingly lesser amount of water would be added. Excess water should not be added, because the water is a reactant and will react with the isocyanate, thereby preventing the isocyanate-polyol reaction. This would prevent a foam cell structure from forming and would cause too much carbon dioxide to evolve.

Other blowing agents used to foam polyurethane generally operate by vaporizing at temperatures which are lower than that at which the foaming reaction takes place, rather than by reacting with any of the components of the reaction mixture. Such other blowing agents include halocarbons like trichlorofluoromethane, dichlorodifluoromethane, and methylene chloride, ethanol mixed with dibutylphthalate, and other volatile liquids or liquid mixtures. Because these blowing agents act by vaporizing, they are generally added, like water, just before the foaming reaction begins. However, we have found that under most circumstances it is not feasible to use such conventional physical blowing agents due to the temperature requirement of the asphalt-polyol mixture, which is highly viscous.

6. Polyisocyanate

A number of polyisocyanates can be used to create the asphaltic foam of the present invention. These polyisocyanates, like the polyols, should have at least two and preferably three functionalities per polyisocyanate molecule.

In the process of the present invention, polyisocyanates are added to the reaction mixture in a particular stoichiometric molar ratio compared to the amount of polyol added. This ratio should be in the range of 1.3:1 to 0.95:1 (polyisocyanate:polyol), and preferably about 1.1:1.

In a preferred embodiment, a polyisocyanate molecule having about 3 NCO functionalities is used in the process of the present invention. This molecule is, preferably, a polymeric MDI-type molecule. Polymeric MDI is preferred due to its low toxicity and low vapor pressure at room temperature. Mondur E-489 (Miles, Inc.) is a polymeric MDI which has been found to produce a satisfactory asphaltic foam product. Other polyisocyanates which can be used include PAPI 580 (Dow), PAPI 901 (Dow), PAPI 27 (Dow), Mondur MR (Miles), Mondur 437 (Miles), Rubinate HF-185 (ICI), and LUPRANATE M70 (BASF).

7. Other Ingredients

A variety of other ingredients can be added to the reaction mixture in minor amounts according to the process of the present invention in order to impart certain desired characteristics to the final asphaltic foam product. For example, in order to assure an even cell structure in the foam material, a silicone surfactant such as Air Products DABCO-193 or DABCO-197 can be added during the blending of the polyol-asphalt mixture. If 4% of a surfactant (based on the polyol weight) is added to the reaction mixture, a foam having smaller, homogenous cells is obtained.

Plasticizers, such as dioctylphthalate, diisooctylphthalate, dibutylphthalate, diisobutylphthalate, dicaprylphthalate, diisodecylphthalate, tricresylphosphate, trioctylphosphate, diisooctyladipate, and diisodecyladipate, can also be used in the present process to make the reactants used in the process less viscous. Plasticizers in this application act as emulsifiers and viscosity reducers.

In general, it is preferred not to add catalysts to speed the foaming reaction. It has been found, for example, that catalysts such as triethylamine and triethanolamine cause a foaming reaction which is too rapid to be used in manufacturing foam products. However, catalysts which speed the curing of the final foam product are advantageously used. Curing catalysts such as Air Products DABCO DC-2 or POLYCAT SA-1 can be added in amounts of 4% based on the total polyol weight.

In addition, other additives such as flame retardants, fillers, and U.V. protectors can also be added to the reactant mixture in order to impart other desired characteristics to the asphaltic foam of the present invention without deleteriously effecting the rigidity and other physical properties which are achieved in the final foam product.

B. Process Steps

To form the asphaltic foam of the present invention, the asphalt described above is first heated to a temperature over its softening point, so that liquid reactants like the polyols can be mixed homogeneously with the asphalt. The asphalt is preferably heated to about 400° F. to assure that the viscosity of the asphalt will be sufficiently lowered to enable proper mixing of the asphalt and the other reactants.

In a preferred embodiment, the asphalt is modified with polyproylene, such as atactic polypropylene. As described previously, polypropylene can be added to the asphalt in an amount of up to 10% by weight of the asphalt, although adding around 5% polypropylene is preferred. After bringing the asphalt to 400° F., APP blocks or pellets is dispersed into the hot asphalt with vigorous agitation, thereby thoroughly blending the APP with the asphalt.

After mixing polypropylene with the asphalt, the polyol or polyols are added to the reaction mixture. Polyols can be added in amounts of between about 5% and about 100% by weight of the asphalt (or, if polypropylene has been added to the asphalt, by weight of the modified asphalt), though they are preferably added in amounts of around 66% by weight of the asphalt or modified asphalt. The amount of polyol added will depend in part in the viscosity of the asphalt mixture, since a greater amount of polyol added will concurrently reduce the proportion of asphalt present, thereby lessening the viscosity of the overall mixture. Of course, viscosity reducers can also be used to bring down the viscosity of the mixture. As described above, in a preferred embodiment, the polyols which are used in the present process are Voranol 270, Multranol 9138, and castor oil, added in approximately equal amounts.

Following the addition of the polyol or polyols to the reaction mixture, the reaction mixture is maintained at between about 150° F. and about 250° F., and preferably at about 200° F., for between 1 and 3 hours, in order to assure the proper mixing of the polyols and the asphalt or modified asphalt. We also believe that the polyols and asphalt may react to some extent during this mixing time, and that maintaining the polyols and asphalt in a mixture at 150° F.–250° F. for a period of time is important for this reason as well.

In a preferred embodiment of the present process, following the mixing of the asphalt and polyols, a viscosity reducer such as Viplex 5 is added to the reaction mixture in order to reduce the viscosity of the mixture prior to the foaming reaction. In this embodiment, viscosity reducer is added to the reaction mixture in an amount of between about 1% and about 5% by weight of the polyol of the mixture. Preferably, about 4% by weight of a viscosity reducer is added, although this amount will depend on the particular viscosity reducer being used.

After adding the viscosity reducer, the reaction mixture should again be mechanically mixed to assure a fairly homogenous distribution of the viscosity reducer in the mixture. The mixture should then be brought to approximately 180° F.

After the foregoing steps and just prior to adding polyisocyanate to the reaction mixture, between approximately 1% and about 5%, and preferably about 4% water is added to the reaction mixture (based on the weight of the polyol). Once the blowing agent has been thoroughly blended into the mixture, the foaming reaction can take place.

Before the polyisocyanate is added, the reaction mixture should be brought to between about 140° F. and 220° F., preferably about 160° F. The lower range of temperatures is preferred. However, since the viscosity of the mixture increases at these temperatures, for ease of manufacture it may not be practicable to use such lower temperatures. The polyisocyanate itself should be at approximately room temperature when it is added to the reaction mixture, since heating the polyisocyanate greatly increases the speed of the reaction. In this case, when the polyisocyanate is added to the rest of the reaction mixture, the temperature of the reactants will generally be about 100°–120° F. As the reaction progresses, the temperature of the foaming reaction mixture will climb to 180° F., since the foaming reaction is exothermic.

The polyisocyanate is added to the reactant mixture in a molar ratio of approximately 0.95:1 to 1.3:1 polyisocyanate:polyol, and preferably in a ratio of about 1.1:1 polyisocyanate:polyol.

The foaming reaction begins as soon as the polyisocyanate is mixed with the remaining ingredients of the reaction mixture. If the Voranol/Multranol/castor oil polyol is used as the polyol for this reaction, a moderate, controlled foaming reaction will take place. If other polyols are used, however, some adjustments to the process may need to be made in order to assure a controlled reaction, as outlined above. In addition to those considerations, it should be kept in mind that Multranol 9138 contains NH groups, which react more quickly than the hydroxy functionalities of most polyols. If polyols besides Multranol 9138 are used and it is necessary or desired to increase the speed of the reaction, another polyol having an amine group can be selected. Alternatively, a separate amine catalyst such as triethylenediamine can be added to the reaction mixture. Such a catalyst should be added after the polyol has been blended well with the asphalt.

The initial stage of the reaction, from the time isocyanate and the asphalt-polyol mixture come into contact until the foam begins to rise, is called the "cream time". During this stage, the foaming reaction mixture thickens. At 120° F., cream stage lasts for about 15–20 seconds. Thus, the polyisocyanate and other reactants should be mixed together for no longer than about 2–6 seconds before being placed into a mold. Otherwise, the foam may expand to a point beyond that desired in the final molded product, or may cure before taking on the desired form of the mold.

In the second stage of the foaming reaction, called the "rise time", the foam begins to expand. During this stage, sufficient $CO_2$ is produced to cause expansion of the foam. In addition, if blowing agents have been added, such blowing agents volatilize at this time, due to the heat created by the foaming reaction. The lengths of the cream time and rise time of the foaming reaction will depend on the chemical reaction rate, the temperature of the mixture, the mold temperature, and the temperature of the environment. The foam is cured when the foam surface is no longer tacky, which usually occurs within 1.5 to 2 minutes.

One of the great advantages of the present process is that it can be performed under the foregoing conditions, which are sufficiently controlled to be useful in a manufacturing process. Asphaltic polyurethane foams produced by prior art methods were, generally, made using lower percentages of asphalt or softer asphalts, as well as lower reaction temperatures. For this reason, such reactions required catalysts to be commercially useful. However, due to the use of the higher reaction temperatures of the present process, catalysts other than the NH groups which can be present in the polyol should not be used.

Although the reaction can be run at temperatures higher than 180° F., the speed of the reaction increases ten times for every 10° F. increase in temperature over 180° F. Thus, although the present reaction can be performed at temperatures of up to 200° F., it is not preferred to use such high temperatures due to the greatly increased speed of the reaction and a concomitant increase in the difficulty of manufacture at such increased speeds. In the case of certain highly viscous asphalts which can be used according to the present invention, higher temperatures will help such asphalts to flow better by reducing their viscosity, but, as stated previously, this aid in manufacturing must be balanced against the difficulty of controlling faster reactions.

Using temperatures above 200° F. is, in most cases, disfavored in the present process. At such higher temperatures, the speed of the foaming reaction becomes unacceptably violent.

In a preferred embodiment, the reaction mixture is injected into a mechanical mixer, such as a Cannon U.S.A. Model C-30. In this embodiment, a metering ratio of 1/1.5 (polyisocyanate/asphalt-polyol reaction mixture) is preferably used.

Generally, the foam takes about 1.5 to 2 minutes to cure once it has expanded to fill a mold into which it has been placed. However, the cure time will depend on the reaction temperature, the type of polyol used, the process environment, and other variables.

Preferably, the reaction mixture is placed in a mold (or, alternatively, a mold is placed around the mixture) in order to form a molded article. However, for some applications the foam can also be allowed to rise freely without a mold.

EXAMPLE 1

A small batch of an improved asphaltic polyurethane foam is produced as follows. A non-blown asphalt having a penetration of about 12 and a softening point of about 135° F. is first selected. This asphalt is available from Oxnard Refinery. Approximately 3 kg of this asphalt is heated to 400° F. in a container. About 0.15 kg of atactic polypropylene is then added to the asphalt in the container. The polypropylene is dispersed homogeneously into the asphalt matrix by mechanically mixing it into the asphalt. This asphalt-polypropylene mixture is known as modified asphalt.

A mixture of polyols is next added to the modified asphalt. These polyols are Voranol 270, Multranol 9138, and castor oil, and each is present in the polyol mixture in about equal amounts by weight. Approximately 2.04 kg of the polyol mixture is added to the modified asphalt and is then mixed in. The reaction mixture is then brought to 200° F. for 2 hours to ensure good mixing of the modified asphalt and the polyols.

Next, about 80 grams of Viplex 5 viscosity reducer is blended into the reaction mixture, and the mixture is brought to 180° F. Following this, about 80 grams of water is mixed into the reaction mixture.

Finally, Mondur 489 polyisocyanate is mixed with the foregoing reaction mixture. Using a mechanical mixer with a metering ratio of 1/1.5 (polyisocyanate/reaction mixture), the polyisocyanate and remaining reaction mixture are injected into the mixture. Within 2–6 seconds, this mixture is then deposited in a mold. The mixture begins rising and forming a foam, and after 60 seconds the foam is completely formed. Within another 2 minutes, the foam is cured.

C. Final Product

The final product of the above-described foaming reaction, after curing, is a hard, rigid asphaltic polyurethane foam. This foam has the following characteristics:

1. Compressive strength—more than 60 psi.
2. Cell structure—more than 85% closed cells.
3. Density—4–10 lb./ft.$^3$
4. Dimensional Stability—no change at 140° F.
5. Weatherability—good.
6. Leaching—Asphalt does not leach from the final product when heat or most solvents are applied to it. However, if the asphaltic foam is extracted with an organic solvent such as trichloroethane, some asphalt components can be extracted from the foam. Thus, while some of the asphalt components covalently bond to the polyurethane polymer of the foam of the present invention, some components seem to be held in the foam by weaker bonds, such as hydrogen bonds.
7. Resistance to water and freezing—good.
8. Resistance to heat—good.

III. Structural Applications for Improved Asphaltic Foam

The rigid asphaltic foam of the present invention can be used in a number of applications in which a structurally strong element is needed. In the construction industry, several such applications are contemplated. The foam of the present invention can, for example, be used as a light weight alternative to concrete tile. Other contemplated uses include as a walking deck, a slab barrier, recover protection board, concrete expansion board, back fill protection board, and base flashing crickets.

The asphaltic foam of the present invention can be used to particular advantage in the roofing sector of the construction industry. For example, as discussed previously, there is a need for an alternative material for ridge caps to replace the presently used asphaltic papers. By combining the low cost, strength, and durability of asphalt with the flexibility of a plastic material, the foam of the present invention can be used as an alternative to conventional asphaltic paper ridge caps.

A. Ridge Cap Having an Elastomeric Strip

In one embodiment the asphaltic foam of the present invention is formed into a bendable ridge cap 10 (FIG. 1). A ridge cap 10 having an elastomeric strip 20 can be made through molding as follows (illustrated in FIGS. 4a–4c). A flat, generally rectangular surface at least 12¼" long and at least 10" wide is first chosen as the lower surface of the mold. The lower surface is preferably the surface of a conveyor belt 40.

On this conveyor belt 40 is placed a layer of roofing granules 30 (FIG. 4c). These granules 30 will serve as both a protective weather layer for the ridge cap 10 and as a mold release. The granules themselves are approximately 40 mesh in size. The protective layer can also be slate flake or other material capable of providing protection from the weather elements.

The layer of roofing granules 30 is preferably about ¼" deep, but can be between about 3/16" and ½" deep. The granules can be indented or impressed with any desired design, pattern, or texture. For example, instead of using a flat surface as the lower surface of the mold, a contoured surface can be used. Such a contoured surface will impress a design into the granules. The granule surface of the final molded product will in this case have a design corresponding to the design of the contoured surface.

The roofing granules 30 can also be colored in order to produce a desired aesthetic effect in the final molded product. For example, blended colored roofing granules 30 can be dropped onto a moving conveyor belt 40. Alternatively, roofing granules 30 of a single color or a mixture of colors can be deposited on the surface of such a conveyor belt 40, after which granules 30 of a different single color or mixture of colors are dropped onto the surface. In this way, a desired pattern can be produced on the surface of the final molded article through the use of such different colored granules 30. Through the use of granules of at least two colors, a shadowing effect can be produced in the final ridge cap product.

After placing the layer of roofing granules 30 on the moving conveyor 40, a strip of modified asphalt 20 is placed on top of the granules 30 (FIG. 4b). The strip 20 is between 1" and ⅝" preferably ½", wide; 1/16" to ⅛" deep; and is as long as the mold. At the pressures used to form the foam 12 of the present invention, the granules 30 of the granule layer which contact the strip 20 will become embedded in the strip 20, adding to the durability of the ridge cap 10.

The modified asphalt of this strip 20 is made up of the asphalt used to produce the foam of the present invention in admixture with about 20% (by weight of the asphalt) atactic polypropylene. This modified asphalt mixture should be sufficiently elastic so that the ridge cap 10 can be bent at an angle. A thin strip of mylar film 50 is preferably placed on top of the modified asphalt strip 20 (FIG. 4a). The mylar strip 50 will allow the mold to be removed from the finished product more easily after the product is formed.

The reaction mixture 60 described in Example 1 is next mixed and placed on the layer of granules 30 on either side of the modified asphalt strip 20 (FIG. 4a). A mold 70 is then placed over the reacting foam 60 such that the foam is completely enclosed within the mold 70 (FIG. 5). This mold includes a V-shaped member which protrudes downward from the roof 71 of the mold 70 to the modified asphalt strip 20. The V-shaped notch 14 whose sides are at an angle of approximately 30° from the horizontal plane of the mold, contacts the modified asphalt strip 20 at the apex of the notch 14. The sides of the mold 70 are preferably of different lengths and thicknesses so as to give a tapered appearance to a ridge when the ridge caps 10 of the present invention are laid on top of one another in a staggered manner, as shown in FIG. 5. The inside surface of the mold itself is also preferable treated with a spray mold release, such as a silicone based mold release.

The reacted foam 12 on either side of the modified asphalt strip 20 in the final ridge cap product 10 thus does not contact the reacted foam 12 on the other side of the modified asphalt strip 20, but is instead connected by the modified asphalt strip 20. Since the modified asphalt strip 20 is elastic, the final ridge cap product 10 can therefore be bent and re-bent without breaking or weakening the ridge cap 10.

EXAMPLE 2

A ridge cap 10 having an elastomeric strip 20 as shown in FIG. 1 is made with the improved asphaltic foam of the present invention as follows. A mold 70 is first made to contain the reacting foam and thereby form a molded asphaltic polyurethane product. The mold 70 includes sides which form an inner surface that is 10" long on two opposite sides, and that has two other sides of unequal length, 12¼" and 10¼" respectively. The thickness (height) of the mold 70 sides rises from ⅛" on the side of the mold 70 which is 10¼" long to ⅝" on the side of the mold which is 12¼" long. The different lengths and thicknesses of the ridge cap 10 formed with such a mold 70 give a tapered appearance to a ridge when the ridge caps 10 are laid on top of one another in a staggered manner. The roof 71 of the mold 70 is generally flat and joins the upper ends of the sides. In order to promote the complete filling of the mold with foam, 4 slight indentations 72 approximately 1/16"–⅛" deep (FIG. 6) are formed in the roof 71 of the mold 70.

A flat, moving conveyor surface 40 about 20" wide is chosen as the lower surface of the mold. On this lower mold surface is placed a layer of roofing granules 30. These granules 30 will serve as both a protective weather layer for the ridge cap 10 and as a mold release. The layer of roofing granules 30 is approximately ¼" deep, 16" wide along with the conveyor. The granules 30 themselves are approximately 40 mesh in size.

After placing the layer of roofing granules 30 on the lower surface of the mold, a strip 20 of modified asphalt is placed on top of the granules 30. The strip 20 is approximately ½" wide, 1/16"–⅛" deep, and is as long as the mold. The modified asphalt of this strip 20 is made up of the asphalt used to produce the foam of the present invention in admixture with about 20% (by weight of the asphalt) atactic polypropylene. This modified asphalt mixture is fairly elastic.

The asphaltic foam described in Example 1 is next mixed, and about 1000 grams of the mixed reactants 60 are placed on the granule layer on either side of the modified asphalt strip 20. The mold 70 is then placed over the reacting foam 60 such that the foam 60 is completely enclosed within the mold 70. The mold 70 includes a V-shaped member which protrudes downward from the roof 71 of the mold 70 to the modified asphalt strip 20. The V-shaped member, whose sides are at an angle of approximately 30° from the horizontal plane of the mold 70, contacts the modified asphalt strip 20 at its apex. At its base, the V-shaped member widens from about ¼" across at the end of the ridge cap 10 which is about 12¼" wide to about ¾" across at the end of the ridge cap 10 which is 10¼" wide.

The reacted foam on either side of the modified asphalt strip 20 in the final ridge cap product thus does not contact the reacted foam on the other side of the modified asphalt strip 20, but is instead connected by the modified asphalt strip 20. Since the modified asphalt strip 20 is elastic, the final ridge cap product can therefore be bent and re-bent without breaking or weakening the ridge cap 10.

EXAMPLE 3

A continuous process for producing the ridge cap 10 of Example 2 is as follows. In this embodiment, the upper surface of a conveyor belt 40 forms the lower surface of the mold 70. The conveyor belt 40 is preferably about 20" wide.

On the conveyor belt 40 is placed a 16" wide layer of roofing granules 30. These granules 30 are deposited on the conveyor belt 40 in a layer approximately ¼" deep. Mechanical scrapers approximately ¼" from the conveyor belt surface extending the width of the conveyor belt 40 assure a relatively even thickness of granules 30 in the granule layer.

In this embodiment, the modified asphalt strip 20 and the two strips of reacting foam on either side of it are deposited continuously on the conveyor belt 40. The conveyor belt 40 should move just fast enough so that the extruded foam is dropped on the granule surface in an amount which will result in the mold 70 being completely filled. Just after the modified asphalt strip 20 is deposited, a 0.5 mm wide strip of mylar film 50 is then dropped on top of the modified asphalt strip 20. The mylar strip 50 will allow the mold 70 to be removed from the finished product more easily after the product is formed.

After the modified asphalt strip 20 and reacting mixture are dropped onto the conveyor belt 40, molds 70 as described in Example 2 are placed on the conveyor belt 40 in succession. The molds 70 fit against each other such that the trailing end 74 of one mold 70 (with respect to the direction in which the conveyor belt 40 is traveling) will abut the leading edge 76 of the next mold 70 on the conveyor belt 40. The molds 70 are placed over the modified asphalt strip 20 and the reacting mixture 60 one after the other continuously.

Once the final foam product has been formed and cured, the molds 70 are removed from the products. Since the reacting mixture 60 and modified asphalt strip 20 were placed on the conveyor belt 40 continuously, each ridge cap 10 will be joined to the ridge cap 10 in front of and behind it at this point. However, the molds 70 are formed for the continuous process such that the leading 76 and trailing 74 edges of the mold 70 which contact the dropped modified asphalt strip 20 and reacting mixture 60 allow the formation of only a thing strip of foam between two consecutive ridge caps. Consecutive ridge caps 10 can then be separated after formation by simply bending the ridge cap 10 at this thin strip of foam and breaking one ridge cap 10 from another.

EXAMPLE 4

An alternative embodiment of the ridge cap of Example 3 is provided with vents so that it can function as both a ridge cap 10 and as a ridge vent. In order to provide a venting, a slight indentation or vent 16 is formed in the lower surface of the ridge cap 10 between the modified asphalt strip 20 and the side edge 18 of the ridge cap 10. Such a vent can be provided by including a protruding member in the roof 71 of the mold 70 used to form the ridge cap 10 between the central axis of the roof of the mold 70 and the side edge 18 of the mold 70. In this way, vents 16 can be provided on either side of the central axis of the ridge cap 10 (that is, the axis along which the modified asphalt strip 20 is placed). In addition, multiple vents can also be provided on either side of the modified asphalt strip 20 of the ridge cap 10.

B. Roofing Tiles

The asphaltic foam of the present invention is also useful in the roofing industry in producing roofing tiles 100. A roofing tile 100 as shown in FIGS. 2 and 3 having similar dimensions to the ridge cap 10 described above can be made through molding in generally the same way as the previously described ridge cap. A flat, generally rectangular surface at least 12¼" long and at least 10" wide is first chosen as the lower surface of the mold. The lower surface is preferably the surface of a conveyor belt 40.

On this conveyor belt 40 is placed a layer of roofing granules 30. These granules 30 will serve as both a protective weather layer for the roofing tile 100 and as a mold release. The granules 30 themselves are approximately 40 mesh in size. The protective layer can also be slate flake or other material capable of providing protection from the weather elements.

The layer of roofing granules 30 is preferably about ¼" deep, but can be between about 3/16" and ½" deep. The granules 30 can be indented or impressed with any desired design, pattern, or texture. For example, instead of using a flat surface as the lower surface of the mold, a contoured surface can be used. Such a contoured surface will impress a design into the granules 30. The granule surface of the final molded product will in this case have a design corresponding to the design of the contoured surface.

After placing the layer of roofing granules 30 on the moving conveyor, the reaction mixture 60 described in Example 1 is next mixed and placed on the granule layer, preferably in two strips on either side of the midline of the lower surface. A mold 70 is then placed over the reacting foam such that the foam is completely enclosed within the mold 70. The inside surface of the mold itself is preferably treated with a spray mold release, such as a silicone based mold release.

A roofing tile 100 can be produced with decorative patterns of granules 30 as follows. The upper surface of a conveyor belt 40 or a lower mold piece is provided with a contoured surface having a decorative pattern, such as a wave. A roofing tile having a wave design is depicted in FIG. 2. When the granules 30 are placed on this contoured surface, the granules 30 conform to a pattern which is the inverse of the pattern that is on this contoured surface. The final roofing tile 100 product will thus have this inverse pattern embossed on it.

Alternatively, a wave pattern can be produced by passing a modified roller over the surface of the granules 30 prior to dropping the modified asphalt 20 or reaction mixture 60 on them. Such a roller is generally cylindrical but also has a protruding member which extends axially from the cylindrical roller. When this roller is passed over the granules 30, it will form a flat, even granule surface except where the protruding member contacts the granule layer. Where the protruding member contacts the granule layer, an indentation is formed in the granule layer. After the reaction mixture 60 is added to the granule layer, the mixture 60 will foam and fill in the indented portion of the granule layer. The final roofing tile product 100 will have a "wave" pattern as a result. One of skill in the art will appreciate that such a method can also be practiced with the ridge caps 10 of the present invention and also with other articles formed from the asphaltic foam of the present invention.

EXAMPLE 5

A continuous process for producing an asphaltic foam roofing tile 100 is as follows. In this embodiment, the upper surface of a conveyor belt 40 forms the lower surface of the mold 70. The conveyor belt 40 is preferably about 20" wide.

On the conveyor belt 40 is placed a 16" wide layer of roofing granules 30. These granules 30 are deposited on the conveyor belt 40 in a layer approximately ¼" deep. Mechanical scrapers approximately ¼" from the conveyor belt surface extending the width of the conveyor belt 40 assure a relatively even thickness of granules 30 in the granule layer.

Two strips of reacting foam 60 are deposited continuously on the conveyor belt 40 on either side of the midline of the lower surface of the mold 70. The conveyor belt 40 should move just fast enough so that the extruded foam 60 is dropped on the granule surface in an amount which will result in the mold 70 being completely filled. After the reacting mixture 60 is dropped onto the conveyor belt 40, molds 70 are placed on the conveyor belt 40 in succession. The molds 70 fit against each other such that the trailing end 74 of one mold 70 (with respect to the direction in which the conveyor belt 40 is traveling) will abut the leading edge 76 of the next mold 70 on the conveyor belt 40. The molds 70 are placed over the reacting mixture one after the other continuously.

Once the final roofing tile product 100 has been formed and cured, the molds 70 are removed from the products. Consecutive roofing tiles 100 can then be separated after formation.

EXAMPLE 6

The roofing tile 100 of Example 5 can also be produced with decorative patterns of granules 30 in which the granules 30 have different colors. Granules 30 having a darker color are first dropped onto the surface of the conveyor belt 40 over a short portion of the conveyor belt 40 (on the order of 1–3 inches) to form a dark band 80. Granules 30 having a lighter color are then dropped on the conveyor belt 40 over a length of 6–10 inches, after which darker granules 30 are again dropped onto the belt, forming a second dark band 80. A roofing tile 100 is then produced as described in Example 5. The product of this process is depicted in FIG. 3.

IV. Conclusion

Although the present invention has been described herein in terms of certain preferred embodiments, these embodiments are illustrative only and do not limit scope of the present invention. Thus, those of skill in the art will appreciate that there are other ways of making and using the present invention besides those explicitly described herein which fall within the scope of this invention. The references referred to herein are, in addition, hereby incorporated by reference.

What we claim is:

1. A ridge cap formed from an asphaltic foam material, comprising:

(1) a layer of said asphaltic foam material having an upper surface and a lower surface;

(2) a layer of granules embedded in said upper surface of said layer of asphaltic foam material, said granules forming a decorative and/or protective layer of said ridge cap; and (3) an elastomeric strip connected to said layer of asphaltic foam material along a central axis of said layer and covered with said granules, wherein said ridge cap is bendable along said central axis.

2. The ridge cap of claim 1, wherein said ridge cap is rectangular in shape.

3. The ridge cap of claim 1, wherein said elastomeric strip comprises a strip of modified asphalt.

4. The ridge cap of claim 1, wherein said elastomeric strip connects two sections of said layer of rigid asphaltic foam material.

5. The ridge cap of claim 1, wherein said granules are roofing granules.

6. The ridge cap of claim 1, wherein said layer of granules is between about 3/16" and 1/2" deep.

7. The ridge cap of claim 1, wherein said granules are different colors.

8. The ridge cap of claim 7, wherein the different colored granules form a decorative pattern.

9. The ridge cap of claim 1, further comprising a vent in a lower surface of said layer of asphaltic foam material.

10. The ridge cap of claim 1, wherein said rigid asphaltic foam material is formed by:

(a) providing asphalt having a penetration range of between approximately 5–25 and a softening point of between approximately 120° F. and 200° F.;

(b) liquefying said asphalt;

(c) adding to said asphalt a polyol, thereby forming an intermediate polyol mixture, wherein said polyol has on average between 3 and 6 hydroxy groups;

(d) bringing the temperature of said intermediate polyol mixture to between approximately 140° F. and 200° F.;

(e) adding a blowing agent to said intermediate polyol mixture, thereby forming a foamable mixture; and (f) mixing a polyisocyanate with said foamable mixture, said polyisocyanate being added to said foamable mixture in a molar ratio of polyisocyanate:polyol of between about 1.3:1 and about 1.1:1, wherein said polyisocyanate and said foamable mixture react to form said asphaltic foam material.

11. The ridge cap of claim 10, wherein a surfactant is additionally added to said intermediate polyol mixture.

12. The ridge cap of claim 10, wherein a catalyst is additionally added to said reaction mixture.

13. The ridge cap of claim 10, wherein a flame retardant is additionally added to said reaction mixture.

14. The ridge cap of claim 10, wherein a viscosity reducer is additionally added to said reaction mixture.

15. A cap formed through a molding process, said process comprising the steps of:

a) providing a lower surface to support a mold for forming said ridge cap;

b) applying a granule layer to said lower surface;

c) placing a strip of asphalt blended with an asphalt modifier which is not the same as the polyol of step d)(1) on top of said granule layer d) thereafter, placing a reaction mixture on said granule layer, said mixture formed by:

(i) combining asphalt having a penetration range of between approximately 5–25 and a softening point of between approximately 120° F. and 200° F. with a polyol having on average between 3 and 6 hydroxy groups, thereby forming an intermediate polyol mixture; and (ii) mixing a blowing agent and a polyisocyanate with said intermediate polyol mixture to form said reaction mixture, wherein said polyisocyanate is added to said intermediate polyol mixture in a molar ratio of polyisocyanate:polyol of between about 1.3:1 and about 1.1:1; and (e) placing a mold over said reaction mixture to cure, thereby forming an asphaltic foam ridge cap, wherein said granules are embedded therein.

16. The ridge cap of claim 15, wherein said polyol used to form said ridge cap is a mixture of polyols, said mixture of polyols comprising approximately equal amounts of:

(1) a first polyol, said first polyol having three hydroxy groups;

(2) a second polyol having three hydroxy groups; and (3) castor oil.

17. The ridge cap of claim 16, wherein said first polyol is VORANOL™ 270, said VORANOL™ 270 having an average of three hydroxy groups per molecule, a hydroxyl number (mg KOH/g) of 235 and a molecular weight of about 700.

18. The ridge cap of claim 16, wherein said second polyol is MULTRANOL™ 9138, said MULTRANOL™ 9138 having an average of three hydroxy groups per molecule, a hydroxyl number of about 700 and a molecular weight of 240.

19. The ridge cap of claim 16, wherein said blowing agent used to form said ridge cap is water, and wherein said water is added in an amount of about 1–5% by weight of said polyol.

20. The ridge cap of claim 15, wherein a surfactant is additionally added to said intermediate polyol mixture.

21. The ridge cap of claim 15, wherein a catalyst is additionally added to said reaction mixture.

22. The ridge cap of claim 15, wherein a flame retardant is additionally added to said reaction mixture.

23. The ridge cap of claim 15, wherein a viscosity reducer is additionally added to said reaction mixture.

24. The ridge cap of claim 15, wherein said asphalt used to form said ridge cap comprises the following components:

about 26.8% by weight asphaltene;

about 8.8% by weight saturated hydrocarbons;

about 30.5% polar components; and about 33.9% aromatic components.

25. The ridge cap of claim 15, wherein said lower surface used to form said ridge cap is a conveyor belt and said ridge cap is formed by a continuous process, wherein step (c) additionally comprises placing said strip of modified asphalt on top of said granule layer continuously, and wherein step (e) comprises placing said reaction mixture on said conveyor belt continuously.

26. The ridge cap of claim 15, wherein said ridge cap is rectangular in shape.

27. A molded asphaltic foam product for use in roofing, comprising:

a layer of molded asphaltic foam material, said layer having an upper surface and a lower surface; and a layer of granules embedded in said upper surface of said asphaltic foam material.

28. The asphaltic foam product of claim 27, wherein said layer of granules is between about 3/16" and 1/2" deep.

29. The ridge cap of claim 27, wherein said granules are slate flake.

30. The asphaltic foam product of claim 27, wherein said granules are different colors.

\* \* \* \* \*